(12) United States Patent
Graceffo et al.

(10) Patent No.: US 11,431,417 B2
(45) Date of Patent: Aug. 30, 2022

(54) METHODS AND APPARATUS FOR RECEPTION OF LOW PHOTON DENSITY OPTICAL SIGNALS

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/035,187

(22) Filed: Sep. 28, 2020

(65) Prior Publication Data

US 2021/0099234 A1    Apr. 1, 2021

Related U.S. Application Data

(60) Provisional application No. 62/906,487, filed on Sep. 26, 2019, provisional application No. 62/906,490, filed on Sep. 26, 2019.

(51) Int. Cl.
| | | |
|---|---|---|
| *H04B 10/60* | (2013.01) | |
| *H04B 10/516* | (2013.01) | |
| *G02B 17/00* | (2006.01) | |
| *G02F 1/137* | (2006.01) | |

(52) U.S. Cl.
CPC ......... *H04B 10/516* (2013.01); *G02B 17/004* (2013.01); *G02F 1/137* (2013.01); *H04B 10/60* (2013.01)

(58) Field of Classification Search
CPC .... H04B 10/615; H04B 10/671; H04B 10/60; G02B 17/004
See application file for complete search history.

(56) References Cited

U.S. PATENT DOCUMENTS

| | | | | | |
|---|---|---|---|---|---|
| 4,172,663 | A | * | 10/1979 | Byer | G01J 3/26 356/454 |
| 4,417,964 | A | * | 11/1983 | Wolfrum | C07C 17/25 204/157.95 |
| 4,980,892 | A | * | 12/1990 | Cunningham | H01S 5/34 372/50.1 |
| 5,761,228 | A | * | 6/1998 | Yano | H04B 10/504 398/155 |

(Continued)

*Primary Examiner* — Tanya T Motsinger
(74) *Attorney, Agent, or Firm* — Lando & Anastasi, LLP

(57) ABSTRACT

An optical receiver includes a photonic integrator configured to accumulate optical signal energy corresponding to the input optical signal during an integration period, and to produce an output optical signal at an end of the integration period, the output optical signal having a higher intensity than the input optical signal, a shutter operable between a closed position and an open position, the shutter configured to prevent the output optical signal from exiting the photonic integrator when in the closed position and to allow the output optical signal to exit the photonic integrator when in the open position, a synchronizer coupled to the shutter and configured to control the shutter between the open position and the closed position; and a photodetector configured to receive the output optical signal when the shutter is in the open position and to produce an electrical signal corresponding to the output optical signal.

21 Claims, 5 Drawing Sheets

(56) References Cited

U.S. PATENT DOCUMENTS

| | | |
|---|---|---|
| 9,018,575 B2 | 4/2015 | Kowalevicz et al. |
| 9,165,963 B2 | 10/2015 | Kowalevicz et al. |
| 9,171,219 B2 | 10/2015 | Kowalevicz |
| 9,323,034 B2 | 4/2016 | Dolgin |
| 9,400,414 B2 | 7/2016 | Kowalevicz |
| 9,451,185 B2 | 9/2016 | Dolgin et al. |
| 9,503,660 B2 | 11/2016 | Kowalevicz et al. |
| 9,535,245 B1 | 1/2017 | Kowalevicz |
| 9,538,096 B2 | 1/2017 | Dolgin |
| 9,887,779 B2 | 2/2018 | Kowalevicz |
| 9,973,281 B2 | 5/2018 | Kowalevicz et al. |
| 10,164,765 B2 | 12/2018 | Dolgin et al. |
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,340,965 B2 | 7/2019 | Dolgin et al. |
| 10,374,743 B2 | 8/2019 | Dolgin et al. |
| 10,378,880 B2 | 8/2019 | Dolgin et al. |
| 10,498,464 B2 | 12/2019 | Graceffo et al. |
| 10,530,494 B2 | 1/2020 | Dolgin et al. |
| 10,554,306 B1 | 2/2020 | Graceffo et al. |
| 10,571,774 B2 | 2/2020 | Graceffo et al. |
| 10,637,580 B2 | 4/2020 | Dolgin et al. |
| 10,686,533 B2 | 6/2020 | Dolgin et al. |
| 10,714,251 B2 | 7/2020 | Dolgin et al. |
| 10,826,603 B1 | 11/2020 | Kowalevicz et al. |
| 10,924,189 B2 | 2/2021 | Kowalevicz et al. |
| 11,012,160 B2 | 5/2021 | Kowalevicz et al. |
| 11,101,896 B2 | 8/2021 | Kowalevicz et al. |
| 11,133,873 B1 | 9/2021 | Kowalevicz et al. |
| 11,159,244 B2 | 10/2021 | Graceffo et al. |
| 11,159,245 B2 | 10/2021 | Kowalevicz et al. |
| 2004/0142696 A1 | 7/2004 | Saunders et al. |
| 2006/0245765 A1 | 11/2006 | Elahmadi et al. |
| 2009/0208225 A1* | 8/2009 | Daghighian ......... G02F 1/0136 398/184 |
| 2011/0242290 A1* | 10/2011 | Arai .................. H04N 13/341 348/51 |
| 2012/0104228 A1* | 5/2012 | Souchkov ............. H04N 5/378 250/214 P |
| 2012/0154542 A1* | 6/2012 | Katz ...................... A63F 13/06 348/47 |
| 2013/0099140 A1* | 4/2013 | Nakarai ............... H01S 3/1305 250/493.1 |
| 2013/0126755 A1* | 5/2013 | Kemnitz ............ G01N 21/6408 250/200 |
| 2014/0308039 A1 | 10/2014 | Sun et al. |
| 2016/0211939 A1 | 7/2016 | Yu et al. |
| 2018/0054259 A1 | 2/2018 | Kowalevicz et al. |
| 2018/0091227 A1 | 3/2018 | Dolgin et al. |
| 2018/0091228 A1 | 3/2018 | Kowalevicz et al. |
| 2018/0091230 A1 | 3/2018 | Dolgin et al. |
| 2018/0091232 A1 | 3/2018 | Dolgin et al. |
| 2018/0102853 A1 | 4/2018 | Dolgin et al. |
| 2018/0145764 A1 | 5/2018 | Dolgin et al. |
| 2018/0145765 A1 | 5/2018 | Kowalevicz et al. |
| 2018/0167145 A1* | 6/2018 | Dolgin .................. G02B 5/284 |
| 2018/0234231 A1* | 8/2018 | Dolgin .................. H04L 7/033 |
| 2018/0328863 A1* | 11/2018 | Rui ........................ G01T 1/242 |
| 2018/0367223 A1* | 12/2018 | Graceffo ............... H04B 10/50 |
| 2019/0007091 A1* | 1/2019 | Graceffo ............... H04B 10/69 |
| 2019/0158208 A1* | 5/2019 | Dolgin ................ H04B 10/677 |
| 2019/0208183 A1* | 7/2019 | Schmidt ............... H04N 5/2256 |
| 2019/0295264 A1* | 9/2019 | Petilli ..................... G06T 7/285 |
| 2019/0305853 A1* | 10/2019 | Dolgin .................. H04B 10/11 |
| 2020/0096504 A1* | 3/2020 | Kawata .................. B01L 3/502 |
| 2020/0136727 A1 | 4/2020 | Graceffo et al. |
| 2020/0328811 A1 | 10/2020 | Mertz et al. |
| 2020/0371328 A1 | 11/2020 | Kowalevicz et al. |
| 2020/0403709 A1* | 12/2020 | Graceffo ............... H04B 10/67 |
| 2020/0409189 A1 | 12/2020 | Graceffo et al. |
| 2021/0006336 A1 | 1/2021 | Kowalevicz et al. |
| 2021/0021351 A1 | 1/2021 | Kowalevicz et al. |
| 2021/0021449 A1 | 1/2021 | Graceffo et al. |
| 2021/0021775 A1* | 1/2021 | Lee ....................... H04N 5/378 |
| 2021/0041515 A1 | 2/2021 | Dolgin |
| 2021/0099232 A1 | 4/2021 | Graceffo et al. |
| 2021/0099234 A1* | 4/2021 | Graceffo ................ G02F 1/137 |
| 2021/0105073 A1 | 4/2021 | Graceffo et al. |
| 2021/0126715 A1 | 4/2021 | Graceffo et al. |
| 2021/0199821 A1* | 7/2021 | Iltis ......................... G01T 1/29 |
| 2021/0314071 A1 | 10/2021 | Graceffo et al. |
| 2021/0389467 A1* | 12/2021 | Eshel .................. G01S 7/4816 |

\* cited by examiner

METHODS AND APPARATUS FOR RECEPTION OF LOW PHOTON DENSITY OPTICAL SIGNALS

CROSS-REFERENCE TO RELATED APPLICATIONS

This application claims priority under 35 USC § 119(e) to U.S. Provisional Patent Application Ser. No. 62/906,487, titled "METHODS AND APPARATUS FOR TRANSMISSION AND DETECTION OF LOW PHOTON DENSITY OPTICAL SIGNALS," filed Sep. 26, 2019, and U.S. Provisional Patent Application Ser. No. 62/906,490, titled "METHODS AND APPARATUS FOR TRANSMISSION AND DETECTION OF LOW PHOTON DENSITY OPTICAL SIGNALS," filed Sep. 26, 2019, both of which are hereby incorporated by reference in their entirety for all purposes.

BACKGROUND

There are many applications in which it may be desirable to conceal transmission of a communications signal. Free space optical communications is a relatively secure communications method when compared to radio frequency communications. The security largely comes from the narrow beam width of an optical transmission. However, with the appropriate equipment, optical signals can be detected and intercepted. For example, optical communications signals in the infrared spectrum can be detectable using devices such as a Short-Wave Infrared (SWIR) camera. Conventionally, burst transmissions are used to minimize the probability of detection.

SUMMARY OF INVENTION

Aspects and embodiments are directed to a technique that improves the sensitivity of an optical receiver, and in certain examples, may be used to extend the range of deep space communications. In addition, further aspects and embodiments provide methods and apparatus that reduce the detectability of free space optical transmissions. Embodiments of the methods described herein are independent of wavelength and applicable to unmodulated, phase-modulated, and intensity-modulated optical signals.

According to one embodiment, an optical transmitter configured to produce a low-photon-density modulated optical signal, the optical transmitter comprises an input configured to receive a data payload including a plurality of symbols each having a constant symbol duration, an optical source configured to emit a continuous optical carrier waveform, a dilation module configured to apply a spreading code to the data payload to spread each of the plurality of symbols in time to expand the symbol duration by a dilation factor and produce a corresponding plurality of time-dilated symbols, the plurality of time-dilated symbols having a lower photon density than the plurality of symbols, a mapping module configured to map the plurality of time-dilated symbols to a modulation scheme, and a modulator configured to modulate the optical carrier waveform with the plurality of time-dilated symbols according to the modulation scheme to produce the low-photon-density modulated optical signal encoded with the plurality of time-dilated symbols corresponding to the data payload.

In one example, the optical source is a laser.

In another example, the modulator is an electro-optic modulator. In one example, the modulator includes the optical source.

In one example, the modulation scheme is an intensity modulation scheme. In another example, the modulation scheme is a phase modulation scheme. In another example, the modulation scheme includes a combination of intensity modulation and phase modulation.

The optical transmitter may further comprise a pulse-shaping filter coupled to the mapping module and to the modulator, and configured to receive the plurality of time-dilated symbols output from the mapping module and to control the modulator to impose the modulation scheme on the optical carrier waveform to generate the low-photon-density modulated optical signal.

In one example, the optical transmitter further comprises an optical assembly configured to output the low-photon-density modulated optical signal. The optical assembly may include at least one mirror or lens.

In another example, the optical transmitter further comprises a forward error correction module configured to implement forward error correction by adding redundancy to the data payload. The forward error correction module may be configured to implement the forward error correction using a block code, a convolution code, or another type of forward error correcting code.

According to another embodiment, a method of producing a low-photon-density modulated optical signal comprises receiving a data payload including a plurality of symbols each having a constant symbol duration, emitting a continuous optical carrier waveform, applying a spreading code to the data payload to spread each of the plurality of symbols in time to expand the symbol duration by a dilation factor and produce a corresponding plurality of time-dilated symbols, the plurality of time-dilated symbols having a lower photon density than the plurality of symbols, mapping the plurality of time-dilated symbols to a modulation scheme, and modulating the optical carrier waveform with the plurality of time-dilated symbols according to the modulation scheme to produce the low-photon-density modulated optical signal encoded with the plurality of time-dilated symbols corresponding to the data payload.

In one example, modulating the optical carrier waveform with the plurality of time-dilated symbols includes using intensity modulation. In another example, modulating the optical carrier waveform with the plurality of time-dilated symbols includes using phase modulation. In another example, modulating the optical carrier waveform with the plurality of time-dilated symbols includes using a combination of intensity modulation and phase modulation.

In one example, the method further comprises transmitting the low-photon-density modulated optical signal using an optical assembly that includes at least one mirror or lens.

In another example, the method further comprises applying forward error correction by adding redundancy to the data payload. Applying the forward error correction may include using a block code, a convolution code, or another type of forward error correcting code.

According to another embodiment, an optical receiver comprises a photonic integrator configured to receive an input optical signal, to accumulate optical signal energy corresponding to the input optical signal during an integration period, and to produce an output optical signal at an end of the integration period, the output optical signal having a higher intensity than the input optical signal, a shutter operable between a closed position and an open position, the shutter configured to prevent the output optical signal from exiting the photonic integrator when in the closed position and to allow the output optical signal to exit the photonic integrator when in the open position, a synchronizer coupled to the shutter and configured to control the shutter between the open position and the closed position, and a photodetector configured to receive the output optical signal when the shutter is in the open position and to produce an electrical signal corresponding to the output optical signal.

In one example, the synchronizer is configured to determine a duration and phase of the integration period and to open the shutter at the end of the integration period. In another example, the synchronizer is configured to align the start of the integration period with the start of a symbol encoded in the input optical signal, and the control the shutter accordingly.

The optical receiver may further comprise an analog to digital converter configured to receive the electrical signal from the photodetector and to convert the electrical signal into a digital signal. In one example, the optical receiver further comprises signal processing circuitry configured to receive and process the digital signal. In one example, the synchronizer is coupled to the signal processing circuitry and configured to receive timing information, duration and phase, from the signal processing circuitry to determine the integration period. In another example, the input optical signal is an intensity modulated signal encoded with a plurality of symbols each having a constant symbol duration, and the integration period corresponds to the symbol duration such that the output optical signal includes a plurality of pulses corresponding to the plurality of symbols, an intensity of each of the plurality of pulses being proportional to an intensity of the corresponding symbol in the input optical signal. In another example, the signal processing circuitry is configured to process the digital signal to recover bits of information corresponding to the plurality of symbols.

In one example, the optical receiver further comprises an optical cavity resonator coupled between the photonic integrator and the photodetector. In one example, the input optical signal is a phase modulated signal encoded with a plurality of symbols each having a constant symbol duration, the integration period corresponding to the symbol duration, and the optical cavity resonator is configured to receive the output optical signal from the photonic integrator and to produce a second output optical signal having an intensity profile representative of phase information in the output optical signal, the phase information being based on the phase modulation of the input optical signal. In one example, the optical cavity resonator is a Fabry-Perot etalon. In another example, the photodetector is configured to detect the second output optical signal and to produce the electrical signal based on the second output optical signal, and signal processing circuitry is configured to process the digital signal to recover bits of information corresponding to the plurality of symbols.

In one example, the photonic integrator is an optical cavity resonator.

In another example, the shutter is a liquid crystal device.

According to another embodiment, an optical receiver configured to detect a low-photon-density intensity modulated optical signal comprises a photonic integrator configured to receive the low-photon-density intensity modulated optical signal and to produce an output optical signal, the low-photon-density intensity modulated optical signal including a plurality of symbols each symbol having a constant symbol duration and a respective intensity based on an intensity modulation scheme used to encode the low-photon-density intensity modulated optical signal, and the output optical signal including a plurality of pulses corresponding to the plurality of symbols, each pulse having an intensity proportional to the respective intensity of a corresponding symbol, a shutter operable between an open position and a closed position, the shutter configured to prevent the output optical signal from exiting the photonic integrator when in the closed position and to allow the output optical signal to exit the photonic integrator when in the open position, a synchronizer coupled to the shutter and configured to maintain the shutter in the closed position for an integration period of the photonic integrator, and to open the shutter at an end of the integration period, the integration period being based on the symbol duration, and a photodetector configured to detect the output optical signal when the shutter is in the open position and to emit an electrical signal corresponding to the output optical signal, the electrical signal having characteristics representative of information encoded in the low-photon-density intensity modulated optical signal via the plurality of symbols.

In one example, at least some symbols of the plurality of symbols represent a binary 1, and pulses of the output optical signal corresponding the at least some symbols representing the binary 1 have an intensity greater than a minimum threshold detection level of the photodetector.

The optical receiver may further comprise an analog to digital converter configured to receive the electrical signal and to convert the electrical signal to a digital signal.

In one example, the optical receiver further comprises signal processing circuitry configured to receive and process the digital signal to recover the information encoded in the low-photon-density intensity modulated optical signal. In another example, the synchronizer is coupled to the signal processing circuitry and configured to receive timing information from the signal processing circuity and to use the timing information to determine the end of the integration period.

In one example, the photonic integrator is an optical cavity resonator.

In another example, the shutter is a liquid crystal device.

According to another embodiment, an optical receiver configured to detect a low-photon-density phase modulated optical signal comprises a photonic integrator configured to receive the low-photon-density phase modulated optical signal and to produce a first output optical signal, the low-photon-density intensity modulated optical signal including a plurality of symbols each symbol having a constant symbol duration, and the first output optical signal including a plurality of pulses corresponding to the plurality of symbols, each pulse having an intensity proportional to and greater than a respective intensity of a corresponding symbol, and a shutter operable between an open position and a closed position, the shutter configured to prevent the first output optical signal from exiting the photonic integrator when in the closed position and to allow the first output optical signal to exit the photonic integrator when in the open position. The optical receiver further comprises a synchronizer coupled to the shutter and configured to maintain the shutter in the closed position for an integration period of the photonic integrator, and to open the shutter at an end of the integration period, the integration period being based on the symbol duration, an optical cavity resonator configured to receive the first output optical signal from the photonic integrator when the shutter is in the open position and to produce a second output optical signal based on the first output optical signal, the second output optical signal having an intensity profile representative of the phase modulation of the low-photon-density phase modulated optical signal, and a photodetector configured to detect the second output optical signal and to emit an electrical signal corresponding to the second output optical signal.

In one example, the photonic integrator is an additional optical cavity resonator. In one example, the optical cavity resonator is a Fabry-Perot etalon.

In certain examples of the optical receiver an intensity of low-photon-density phase modulated optical signal is below a minimum threshold detection level of the photodetector, and the intensity of each of the pulses of the first output optical signal is above the minimum threshold detection level of the photodetector.

The optical receiver may further comprise an analog to digital converter configured to receive the electrical signal and to convert the electrical signal to a digital signal.

In one example, the optical receiver further comprises signal processing circuitry configured to receive and process the digital signal to recover information encoded in the low-photon-density phase modulated optical signal via the phase modulation. In another example, the synchronizer is coupled to the signal processing circuitry and configured to receive timing information from the signal processing circuitry and to use the timing information to determine the end of the integration period.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Certain aspects and embodiments are directed to methods and apparatus for reducing the detectability of free space optical transmissions using time dilation of the encoded symbols. Similar to the way spread spectrum signals spread a fixed amount of energy over a broad range of frequencies to reduce the power spectral density, according to certain embodiments, each symbol in an encoded transmission is spread over a large time interval, thereby reducing the photon density, which may make detection of the transmission more difficult. Certain embodiments are directed to an optical transmitter configured to emit a modulated optical signal encoded with time-dilated symbols. Further embodiments are directed to an optical receiver capable of detecting and demodulating the modulated optical signal. In addition, as discussed further below, certain aspects and embodiments provide an optical receiver with improved sensitivity to allow for reception/detection of very weak optical signals.

In order to detect any optical signal, the number of photons received by a detector from the transmission of interest must be greater than or equal to the minimum detection threshold of the detecting device. According to certain embodiments, an optical transmitter is configured to transmit an optical signal with a reduced photon density, such that the number of photons received by a conventional detector would be below the minimum detection threshold. However, according to further embodiments, an optical receiver is configured to integrate the arriving photons at the receiver for detection. This approach allows the detector to accumulate optical energy over an integration period such that the number of photons in the integrated signal is above the minimum detection threshold. In this manner, very weak optical signals, such as may be received in deep space communications for example, can be detected, whereas these signals would be too weak to be detected by conventional optical detectors. For transmission, in certain aspects, this approach is similar to direct sequence spread spectrum used in radio frequency communications; however, instead of spreading over frequency, the signal is spread over time. The method disclosed herein is referred to a symbol time dilation. According to certain embodiments, the concept is to keep the number of photons the same for each symbol; however, the symbols are spread in time, which reduces the photon density per unit of time. As a result, the symbols are difficult, if not impossible, to detect using a conventional optical receiver. However, as discussed further below, with knowledge of certain characteristics of the time-dilated optical signal, embodiments of a specialized optical receiver can be configured to detect and demodulate the signal, thereby recovering the information encoded in the time-dilated symbols.

Figure 1A:
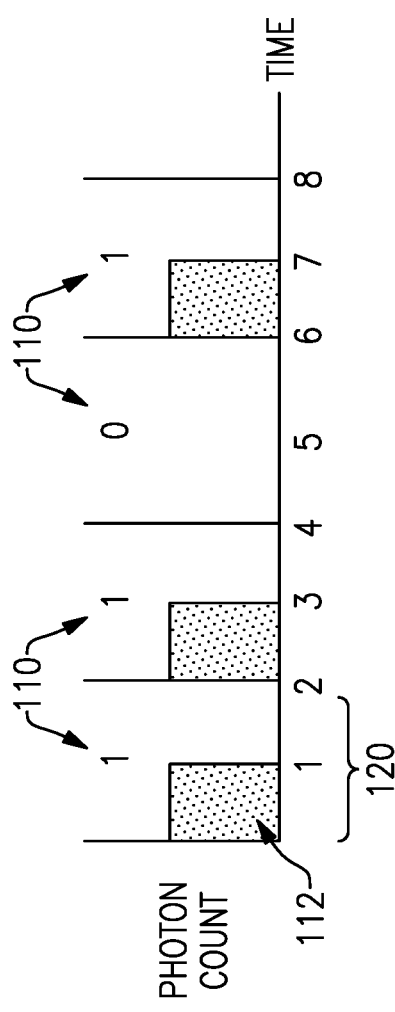
FIGS. 1A and 1B are diagrams illustrating an example of the concept of symbol time dilation according to aspects of the present invention.
Figure 1B:
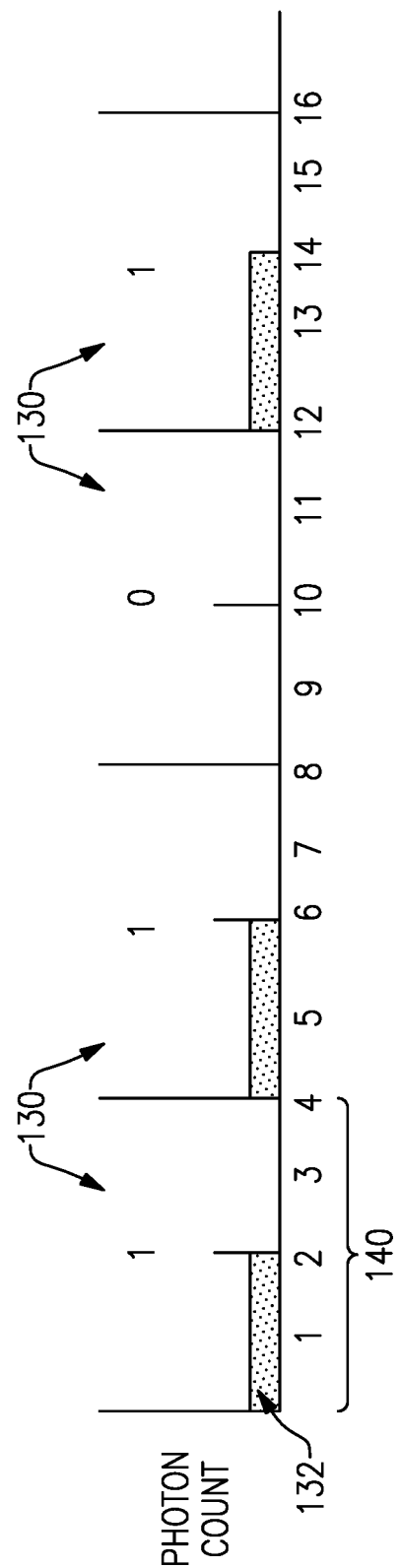

FIGS. 1A and 1B illustrate an example of this concept. FIGS. 1A and 1B illustrate an implementation using intensity modulation. In FIG. 1A, a signal including the binary pattern 1101 is shown using a return-to-zero modulation format with a 50% duty cycle. Each symbol 110 starts on a multiple of two time units, except the first symbol, which starts at zero. Each symbol 110 has a duration 120 of two time units, returning to zero one time unit after it starts (50% duty cycle). The symbol duration 120 also corresponds to or determines a symbol rate of the modulation.

In FIG. 1B, an example of symbol dilation is illustrated using the same binary pattern 1101 having a return-to-zero modulation format with a 50% duty cycle. Here, each dilated symbol 130 starts on a multiple of four time units, except the first dilated symbol, which starts at zero. Each dilated symbol 130 has a duration 140 of four time units, returning-to-zero two time units after it starts (50% duty cycle). The relative scale between FIGS. 1A and 1B is the same, such that the conceptual difference in the photon density can be readily compared between the two signals. In the example of FIGS. 1A and 1B, the total photon count 112, 132, respectively, in each symbol 110 and dilated symbol 130 representing a binary "1" is the same; however, as shown, the dilated symbols 130 in FIG. 1B have a duration 140 that is twice the length (time) of the duration 120 of the symbols 110 in FIG. 1A. As a result, the photon density (i.e., photon count per time unit) in the dilated symbols 130 is halved compared to that of the "normal" symbols 110.

Those skilled in the art will appreciate, given the benefit of this disclosure, that the concept illustrated in and discussed above with reference to FIGS. 1A and 1B may be readily modified in a variety of ways to accommodate different modulation schemes. For example, FIGS. 1A and 1B illustrate an example using a return-to-zero intensity modulation format with a 50% duty cycle. As a result, in the example of FIGS. 1A and 1B, the symbols 110 and dilated symbols 130 that represent a binary "0" have a zero photon count, and the photon counts 112, 132 of the symbols 110 and dilated symbols 130, respectively, representing a binary "1" are contained within a time period corresponding to half the symbol duration 120, 140; however, the concept of symbol time dilation can be applied to other intensity modulation formats. For example, the symbols 110 representing a binary "0" may have a non-zero photon count, in which case, the corresponding dilated symbols 130 would also have a non-zero photon count spread over a portion of the dilated symbol duration 140. Similarly, the duty cycle of the symbols 110 may be other than 50%, in which case, the duty cycle of the dilated symbols 130 may also be other than 50%. In addition, in the example shown in FIGS. 1A and 1B, the duration 140 of each dilated symbol 130 is twice the duration 120 of each corresponding symbol 110; however, in other examples, the dilated symbols 130 may be spread over a longer or shorter time period. In other words, the duration 140 of the dilated symbols may be equal to x times the duration 120 of the symbols 110, where x is a positive integer or non-integer number greater than one. This multiplier x is referred to herein as the dilation factor. Furthermore, symbol time dilation is not limited in application to intensity-modulated optical signals, and may be applied to phase-modulated optical signals or QAM optical signals, as discussed further below.

Figure 2:
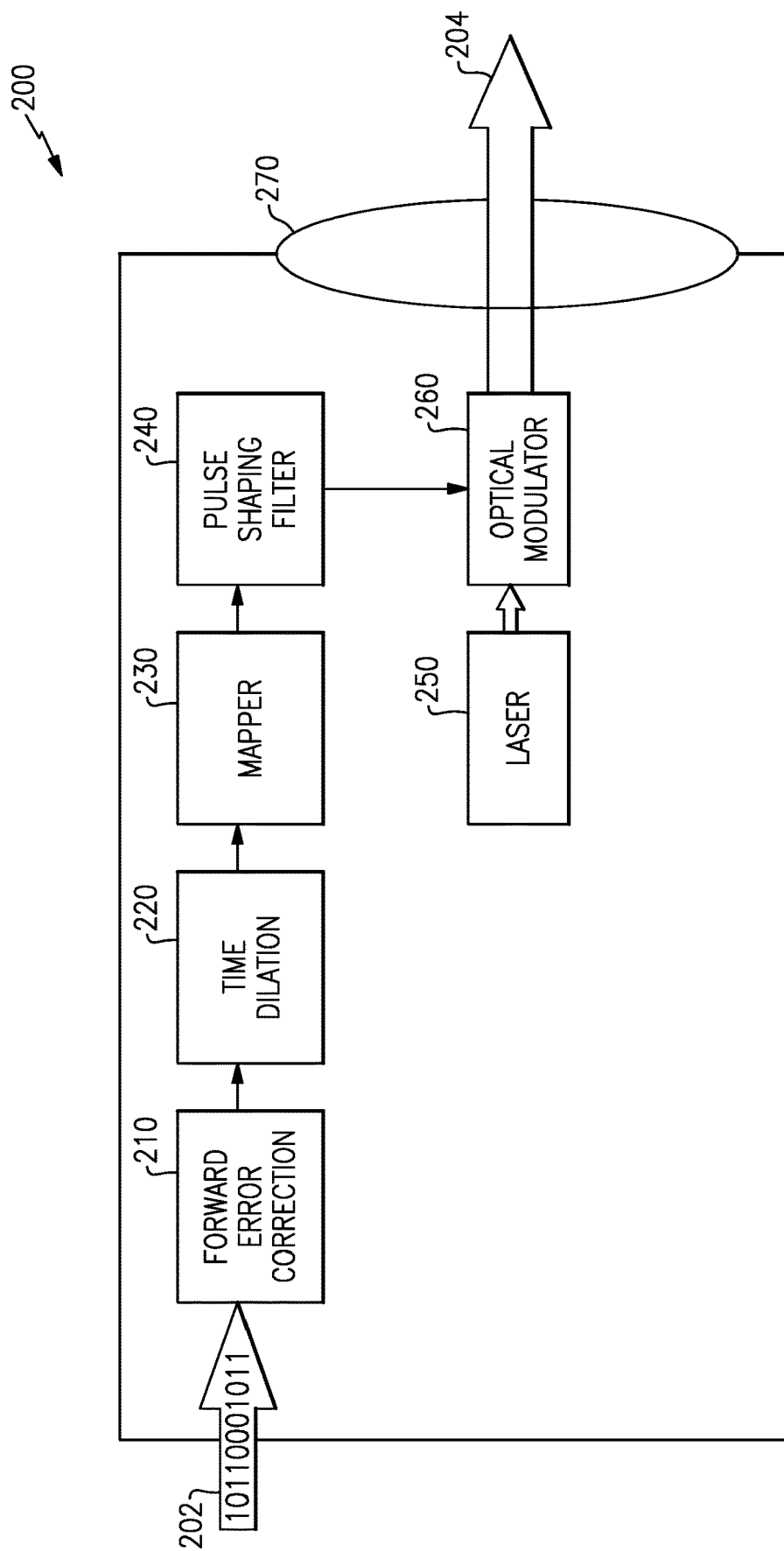
FIG. 2 is a functional block diagram of one example of one example of an optical transmitter configured to apply time dilation to a modulated signal transmission, according to aspects of the present invention.

Referring to FIG. 2 there is illustrated a functional block diagram of one example of an optical transmitter 200 configured to implement symbol time dilation to produce a modulated optical signal encoded with dilated symbols, according to certain aspects. The optical transmitter 200 includes an input to receive a data payload 202. The optical transmitter 200 may further include a forward error correction (FEC) module 210, a spreading or dilation module 220, a mapping module 230, a pulse-shaping filter 240, an optical source (e.g., a laser) 250, a modulator 260, and optics 270 with an output to provide a modulated optical signal 204.

In the optical transmitter 200, the FEC module 210 implements a forward error correction code. The time dilation method disclosed herein works independent of the FEC selected. FEC encoding adds process gain to the signal, which allows for improved performance at lower signal to noise ratios. The method used by the FEC module 210 to improve process gain is dependent on the FEC selected. Two general types of FEC are those that use block codes and those that use convolutional codes, with convolution codes generally having better performance. For example, the FEC module 210 may encode one or more bits within the data payload 202 to reduce an effect that the transmission medium may have on the transmitted signal waveform. Accordingly, in various examples the optical transmitter 200 may include the FEC module 210 to control errors that may result from transmitting the data payload 202 through a noisy or lossy medium.

The spreading or dilation module 220 applies a spreading code to the data payload to implement an example of the symbol dilation discussed above. The spreading code may specify the dilation factor, for example.

The mapping module 230 maps the data payload to a particular modulation scheme, such as various positions of a particular phase and/or amplitude constellation. A pulse-shaping filter 240 may receive the output of the mapping module 230 and control the modulator 260 to impose the modulation scheme on the output from the optical source 250 to generate the modulated optical signal 204. In various examples, the modulator 260 may be an electro-optic modulator, and may include the optical source 250, such as a laser. In particular, the optical source 250 may emit a continuous carrier waveform that is then modulated in phase and/or amplitude for each symbol of the data payload 202 to encode those symbols on the carrier waveform. The transmitter 200 may also include various optics 270 such as one or more mirrors or lenses to output the modulated optical signal 204. Thus, the transmitter 200 is configured to output/transmit the transmitted optical signal 204 that is phase and/or amplitude intensity modulated with a series of dilated symbols 130 corresponding to the data payload 202. The modulation of the transmitted optical signal 204 thus has a dilated symbol rate that is characterized by both a symbol rate (or pulse rate) that would correspond to "normal" symbols 110 and the dilation factor. As discussed further below, optical receivers can be configured with knowledge of this modulation information (e.g., the symbol rate and the dilation factor) to detect the transmitted optical signal 204 and recover the information corresponding to the data payload 204.

Figure 3:
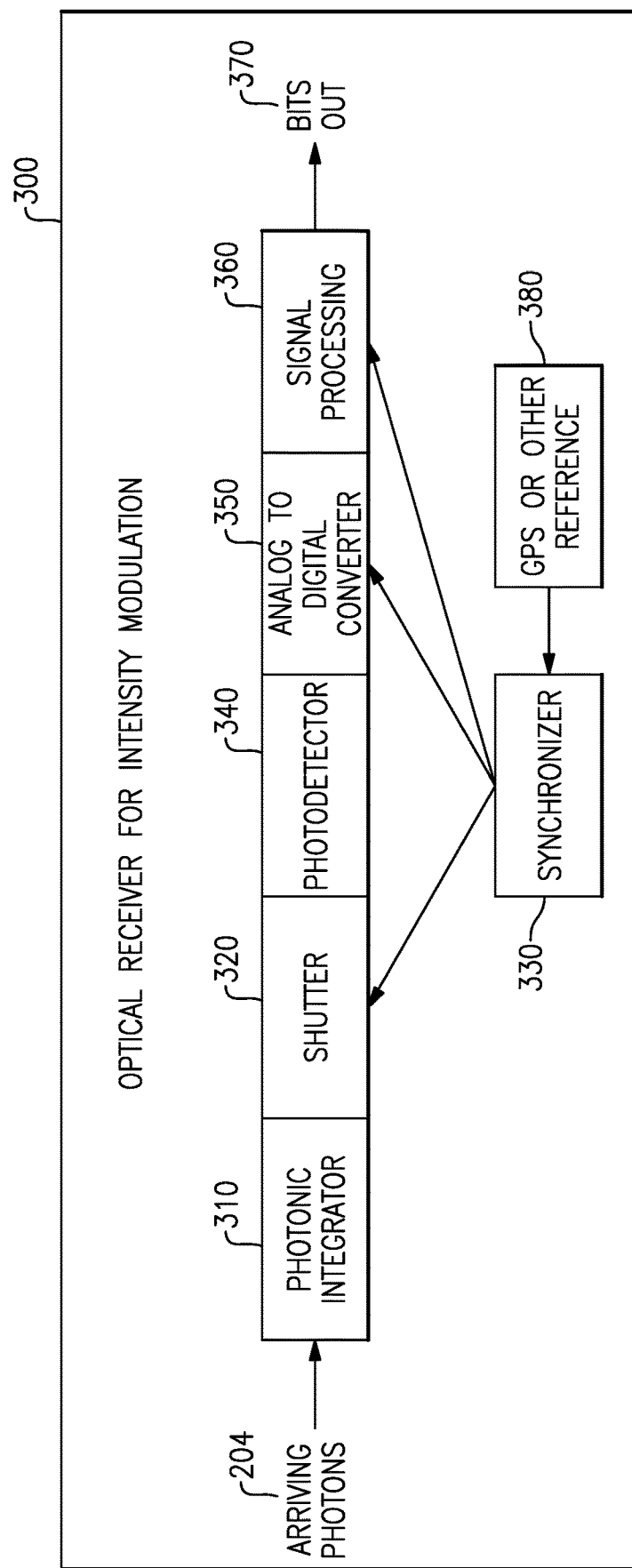
FIG. 3 is a functional block diagram of one example of an optical receiver according to aspects of the present invention.

Referring to FIG. 3, there is illustrated a functional block diagram of an example of an optical receiver configured to detect an intensity-modulated time-dilated optical signal according to certain embodiments. In this example, the optical receiver 300 includes an integrator 310, a shutter 320, a synchronizer 330, a photodetector 340, and various digital processing components. Embodiments of the optical receiver 300 operate according to the following process. While the shutter 320 is closed, the integrator 310 collects photons from the transmitted optical signal 204. The shutter 320 remains closed during an integration period of the optical receiver 300. The synchronizer 330 is configured to determine when the integration period has ended, and at the end of the integration period opens the shutter 320. The optical signal exiting the integrator 310 is directed to the photodetector 340 for conversion to an electrical signal. The electrical signal is converted from analog to digital via an analog-to-digital converter 350, and then processed by signal processing circuitry 360 to recover the bits of information 370 (corresponding to the payload 202) that were encoded via time dilation and modulation on the transmitted optical signal 204, as discussed above.

According to certain embodiments, the integrator 310 is a photonic cavity device that can accumulate photons over time. From basic signal processing theory, it is known that a temporal integrator can be implemented using a linear filtering device having an impulse response (i.e., response to an input impulse launched at time t=0), h(t), that is proportional to the unit step function, u(t), specified in Equation (1):

$$\begin{cases} u(t) = 0 \text{ for } t < 0 \\ u(t) = 1 \text{ for } t \geq 0 \end{cases} \quad (1)$$

Thus, to implement an optical integrator, a structure is needed that can store an incoming optical signal and produce an output that is proportional to the total optical signal energy stored. This can be accomplished using optical cavity resonator. Examples of integrating optical cavity resonators that can be used to implement the integrator 310 include, but are not limited to, Fabry-Perot etalons, micro-ring resonators, and bulk optical resonators.

Figure 4:
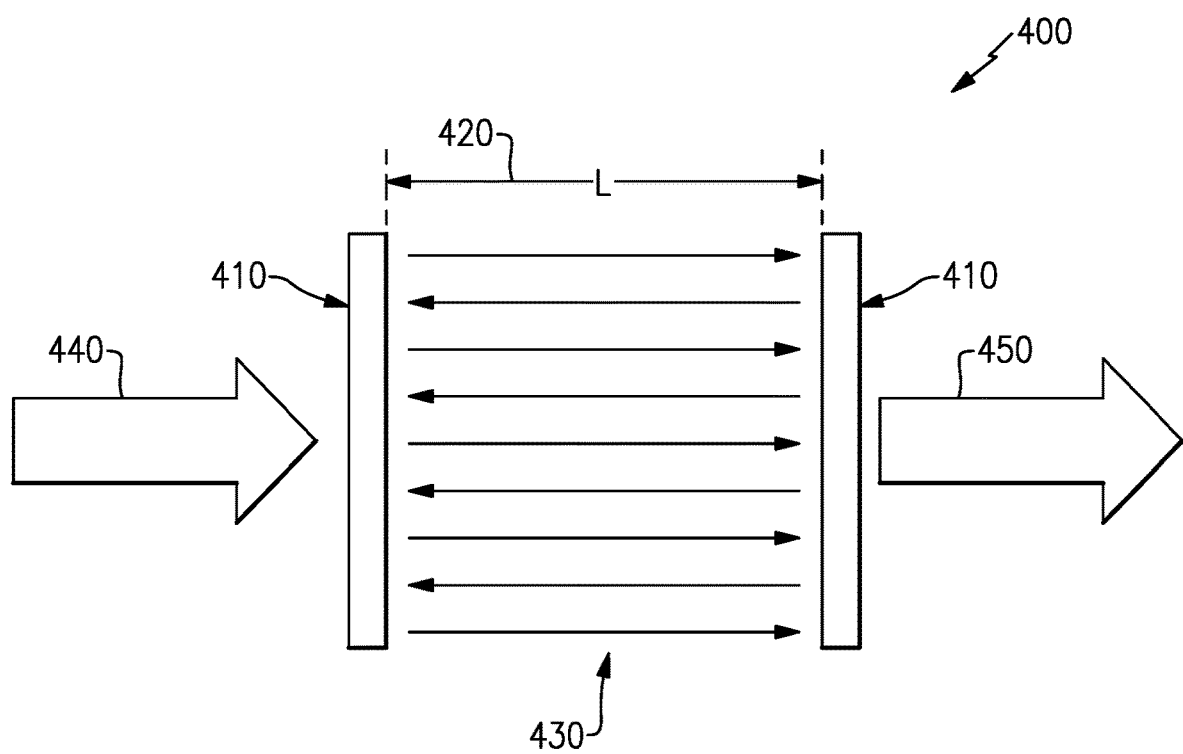
FIG. 4 is a diagram illustrating operation of an example of an optical cavity resonator according to aspects of the present invention.

Referring to FIG. 4, for the general case of a Fabry-Perot etalon 400, the resonant cavity is composed of two at least semi-reflective surfaces 410, each characterized by a reflectivity (r) and separated by a distance, L, (interior dimension or cavity thickness 420). The net gain in the cavity medium 430 (which is the round-trip field amplitude gain, excluding loss caused by the two semi-reflective surfaces 410), is given by a factory γ, where γ<1 for loss and γ>1 for gain. The etalon 400 receives an input optical signal 440, which may include a series of pulses corresponding to the transmitted optical signal 204, for example, accumulates resonant signal energy in the cavity medium 230 based on the input optical signal 440, and produces an output optical signal 450. In this case, assuming that the input optical signal 440 is both spectrally centered at a resonant frequency of the etalon 400 and has a pulse duration that is longer than the round-trip propagation time (T) of the optical signal in the etalon cavity medium 430, the temporal impulse response, corresponding to the output optical signal 450, is given by:

$$h(t) \propto e^{-kt} \cdot u(t) \quad (2)$$

In Equation (2), k is given by Equation (3) below, with T=2Ln/v, where n is the cavity refractive index and v is the speed of light in the material within the etalon cavity (which may be a vacuum, air, or another dielectric material).

$$k = -(1/T)\ln(r^2\gamma) \quad (3)$$

Equations (2) and (3) indicate that the etalon 400 acts as a temporal integrator over a time window that is determined by the resonator decay time, which is in turn influenced by losses in the cavity medium 430 and the semi-reflective surfaces 410. In Equation (2), the input optical signal to the etalon 400 is represented by the unit step function; however, in the more general case, the unit step function may be replaced by a generalized function representing the input signal 440, and the response, or output signal 450, from the etalon 400 is thus proportional to the input signal 440. The etalon 400 (or other cavity resonator) may integrate the field amplitude of the pulses of the input optical signal 440 coherently.

Using the integrator 310, the optical receiver 300 can be configured to detect the transmitted optical signal 204 with dilated symbols 130 by accumulating and integrating the photons corresponding to each dilated symbol 130 until the photon count, or intensity, is sufficient to be above the minimum detection threshold of the photodetector 340. As noted above, without the integrator 310 (as in a conventional optical detector, for example), the photon density in the dilated symbols 130 may be too low to be detected by a photodetector, and therefore, the transmitted optical signal 204 may not be detected by a conventional optical detector/receiver. However, in embodiments of the specially-configured optical receiver 300, the integrator 310 "counteracts" the time dilation applied by the optical transmitter 200 by integrating the photons over at least a portion of the duration 140 of each dilated symbol and then producing the output optical signal 450 as a pulse with a much higher amplitude/intensity, which can be detected by the photodetector 340. As discussed above, the output optical signal 450 has an amplitude that is proportional to the input signal, and therefore, (after detection by the photodetector 340 and conversion to a digital signal by the analog-to-digital converter 350), the signal processing circuitry 360 is able to differentiate between a "1" or a "0" in the data payload 202 based on the differences in the output signal 450, and correspondingly in the electrical signal produced by the photodetector 340. Similarly, more complex intensity modulation schemes than simple binary intensity modulation can also be demodulated.

Thus, to allow detection of the dilated symbols 130, the integrator 310 accumulates the arriving photons for a specified integration period. In certain examples, the integration period may correspond to, or be slightly less than, the duration 140 of dilated symbols 130. The shutter 320 includes a mechanism for containing the arriving photons of the input optical signal 440 (e.g., the transmitted optical signal 204) in the integrator 310 for the integration period. In certain examples, the shutter 320 may be a liquid crystal device or other device that can be made optically opaque in the "closed" condition, to block the output optical signal 450 from exiting the integrator 310, and optically transparent in the "open" condition to allow the output optical signal 450 to exit integrator 310 and pass to the photodetector 340. In other examples, the shutter 320 may be an optical opaque mechanical component that can be physically moved by an actuator into the optical path (to prevent the output optical signal from exiting the integrator 310) and out of the optical path (to allow the output optical signal to pass from the integrator 310 to the photodetector 340).

Operation of the shutter 320 may be controlled by the synchronizer 330. The synchronizer 330 is used to control the phase and to start and stop the integration periods of the integrator 310. That is, the synchronizer 330 operates to align the start of the integration period with the start of a symbol. As discussed above, in certain examples, the integration period may be determined by the pulse rate, or symbol rate, and the dilation factor corresponding to the transmitted optical signal 204. The synchronizer 330 may control the shutter 320 to keep the integrator 310 "closed" and integrating over a period corresponding to each dilated symbol 130, and then open the shutter 320 to allow the output optical signal 450 to be provided to the photodetector 340 for detection. In certain examples, the synchronizer 300 may use a GPS or other reference 380 and/or timing information generated by the signal processing circuitry 360 to control the shutter 320 such that the integrator 310 produces the output optical signal 450 representative of the data payload 202.

Figure 5:
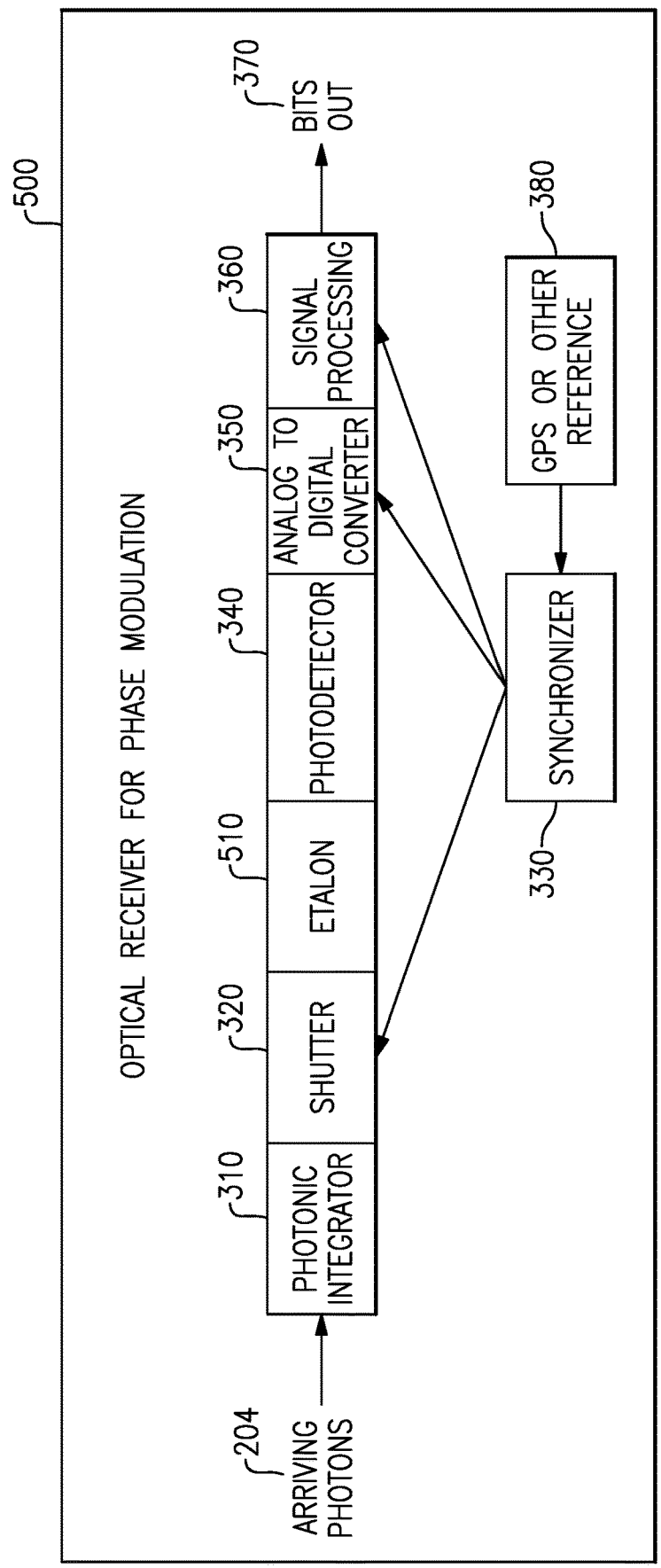
FIG. 5 is a functional block diagram of another example of an optical receiver according to aspects of the present invention.

As discussed above, the method and embodiments of the optical receiver 300 can be applied to detect and demodulate transmitted optical signals 204 having a variety of types of intensity (or amplitude) modulation. In addition, with a modification, the method can also be applied to phase modulated input signals. FIG. 5 is a block diagram of one example of an optical receiver 500 configured to detect a phase modulated time-dilated optical signal according to certain embodiments. The optical receiver 500 is similar to, and may contain similar components to, the optical receiver 300 discussed above. Referring to FIG. 5, embodiments of the optical receiver 500 include the integrator 310, the shutter 320, the synchronizer 330, the photodetector 340, and the analog-to-digital converter 350, and the signal processing circuitry 360. These components may operate as discussed above with reference to FIG. 3. In addition, the optical receiver 500 includes at least one additional optical cavity resonator 510 positioned between the shutter 320 and the photodetector 340. This optical cavity resonator 510 is configured for phase demodulation.

As discussed above, in certain examples, the optical transmitter 200 can be configured to apply time dilation in combination with phase modulation, to produce dilated symbols 130 that may each have the same (or approximately the same) amplitude, but encoded with different phase for the phase modulation. Any of various phase modulation schemes can be applied. In this case, the integrator 310 again operates as discussed above to accumulate/integrate the photons of each dilated symbol 130 over the integration period, and the synchronizer 330 operates to periodically open the shutter 320 (using the reference 380 and/or timing information generated by the signal processing circuitry 360) to allow the output optical signal 450 to exit the integrator 310. As also discussed above, amplitude/intensity information about the input optical 440 can be recovered from the output optical signal 450, which is useful for intensity modulated input optical signals 440. In addition, it has been shown that an optical cavity integrator operates on the complex temporal field envelope (amplitude and phase), and therefore the temporal phase information for the input optical signal 440 can be recovered from the temporal intensity profile at the output of the integrator 310. In embodiments of the optical receiver 500, the output optical signal 450 from the integrator 310 is applied to the optical cavity resonator 510, which produces a second output optical signal having characteristics representative of the phase information contained in the output optical signal 450 from the integrator 310.

The optical cavity resonator 510 converts the phase modulation information contained in the output optical signal 450 in part by interaction of the arriving optical signal 450 with optical energy built-up in the optical cavity resonator 510. The optical cavity resonator 510 may be operated in a resonant or non-resonant mode. The optical signal 450 received by the cavity resonator 510 establishes a steady-state condition in which optical signal energy is accumulated inside the optical cavity resonator 501 and emerges at a constant rate. If the frequency, amplitude, or phase of the arriving optical signal 450 changes, this change causes a temporary disruption to the steady-state inside the optical cavity resonator 510 and the light intensity emerging from the optical cavity resonator 510 is also disrupted, until a steady state condition is re-established. Accordingly, a change in phase, frequency, or amplitude of the arriving optical signal 450 causes a change in intensity of the second output optical signal from the optical cavity resonator 510. Thus, the optical cavity resonator 510 functions as a modulation converter for the phase modulation information that was present in the transmitted optical signal 204 and carried into the output optical signal 450 from the integrator 310. The second output optical signal from the optical cavity resonator 510 may therefore carry the same information content as the transmitted optical signal 204, but in an intensity modulated form, rather than a phase modulated form, for example.

Various embodiments and examples of an optical cavity resonator 510, such as, but not limited to, a Fabry-Perot etalon, operating as a phase modulation converter are described in commonly-owned U.S. Patent Publication No. 2018-0145764 titled "DEMODULATION OF QAM MODULATED OPTICAL BEAM USING FABRY-PEROT ETALONS AND MICRORING DEMODULATORS" and U.S. Patent Publication No. 2018-0102853 titled "SYSTEMS AND METHODS FOR DEMODULATION OF PSK MODULATED OPTICAL SIGNALS," each of which is herein incorporated by reference in its entirety for all purposes.

Thus, the integrator 310 and optical cavity resonator 510 operate together to receive and alter the transmitted optical signal 204 to allow the phase modulated information (corresponding to the data payload 202) to be recovered. As discussed above, the integrator 310 increases the signal strength to above a minimum threshold detection level of the photodetector 340, and the optical cavity resonator converts the phase modulation into intensity modulation, which can be easily detected and decoded by the signal processing circuitry 360 to recover the bits of information 370 (corresponding to the payload 202) that were encoded via time dilation and modulation on the transmitted optical signal 204, as discussed above.

In certain examples, the optical receiver 500 can be configured to detect and demodulate a transmitted optical signal that uses a combination of intensity modulation and phase modulation. As discussed above, the optical cavity resonator 510 is sensitive to changes in both intensity/amplitude and phase of the arriving optical signal, and may therefore produce a second output optical signal that has an intensity profile representative of both types of modulation in combination. In other examples, the integrator 310 may be used to recover information about intensity modulation aspects of the transmitted optical signal 204, as discussed above, and the optical cavity resonator 510 can be used to recover phase modulation aspects of the transmitted optical signal 204. Thus, embodiments of the optical receiver 510 may advantageously be used to detect and decode transmitted optical signals that may use complex modulation schemes (which can be difficult to decode using conventional receivers) as well as time dilation for added transmission security.

Aspects and embodiments provide methods and apparatus by which to transmit, and then detect and decode, free-space optical signals that have reduced detectability through the use of time dilation to reduce photon density. Embodiments of the optical receiver use a photonic integrator to collect photons over an integration period, thereby compensating for the time dilation and allowing the low-photon-intensity/density optical signals to be detected and decoded. As discussed above, embodiments of the methods described herein are independent of wavelength and applicable to both phase-modulated and intensity-modulated optical signals, as well as providing the ability to use complex modulation schemes for increased data volume (through the ability to encode more information per symbol) and/or added security.

Operation of the optical receiver 300 was discussed above in the context of receiving and decoding an intensity-modulated, time-dilated transmitted optical signal 204. However, embodiments of the optical receiver 300 may also be configured and used to detect very weak free-space optical signals, which may or may not be modulated and may not be intentionally time-dilated. There are various applications, such as deep space communications or astronomical observations, where an optical receiver needs to receive a very weak (low photon density) optical signal. Accordingly, for these applications, the optical receiver conventionally needs to be very sensitive. For deep-space communications, typically a very expensive, cryogenically cooled detector is used to lower the noise floor of the receiver so that the weak signals of interest can be detected. In contrast, embodiments of the optical receiver 300 can used the integrator 310 as described above to accumulate the input optical signal 204 over time, and output the output optical signal 450 having a much higher signal level. As a result, because the integrator 310 effectively raises the signal strength, there are less stringent requirements on the sensitivity or noise floor performance of the photodetector 340. Thus, using examples of the optical receiver 300 may allow deep-space communications or other long-range communications at either lower cost (i.e., avoiding the need for highly sensitive and/or cooled detectors) or even greater range.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Accordingly, the foregoing description and drawings are by way of example only, and the scope of the invention should be determined from proper construction of the appended claims, and their equivalents.

What is claimed is:

1. An optical receiver comprising:
    a photonic integrator configured to receive an input optical signal, to accumulate optical signal energy corresponding to the input optical signal during an integration period, and to produce an output optical signal at an end of the integration period, the output optical signal having a higher intensity than the input optical signal;
    a shutter operable between a closed position and an open position, the shutter configured to prevent the output optical signal from exiting the photonic integrator when in the closed position and to allow the output optical signal to exit the photonic integrator when in the open position;
    a synchronizer coupled to the shutter and configured to control the shutter between the open position and the closed position based on the integration period of the photonic integrator; and
    a photodetector configured to receive the output optical signal when the shutter is in the open position and to produce an electrical signal corresponding to the output optical signal a photon density of the input optical signal being below a minimum threshold detection level of the photodetector.

2. The optical receiver of claim 1, wherein the synchronizer is configured to determine a duration and phase of the integration period and to open the shutter at the end of the integration period.

3. The optical receiver of claim 2, further comprising an analog to digital converter configured to receive the electrical signal from the photodetector and to convert the electrical signal into a digital signal.

4. The optical receiver of claim 3, further comprising signal processing circuitry configured to receive and process the digital signal.

5. The optical receiver of claim 4, wherein the synchronizer is coupled to the signal processing circuitry and configured to receive timing information, duration and phase, from the signal processing circuitry to determine the integration period.

6. The optical receiver of claim 4, wherein the input optical signal is an intensity modulated signal encoded with a plurality of symbols each having a constant symbol duration, and wherein the integration period corresponds to the symbol duration such that the output optical signal includes a plurality of pulses corresponding to the plurality of symbols, an intensity of each of the plurality of pulses being proportional to an intensity of the corresponding symbol in the input optical signal.

7. The optical receiver of claim 6, wherein the signal processing circuitry is configured to process the digital signal to recover bits of information corresponding to the plurality of symbols.

8. The optical receiver of claim 4, further comprising an optical cavity resonator coupled between the photonic integrator and the photodetector.

9. The optical receiver of claim 8, wherein the input optical signal is a phase modulated signal encoded with a plurality of symbols each having a constant symbol duration, the integration period corresponding to the symbol duration, and wherein the optical cavity resonator is configured to receive the output optical signal from the photonic integrator and to produce a second output optical signal having an intensity profile representative of phase information in the output optical signal, the phase information being based on the phase modulation of the input optical signal.

10. The optical receiver of claim 9, wherein the photodetector is configured to detect the second output optical signal and to produce the electrical signal based on the second output optical signal, and signal processing circuitry is configured to process the digital signal to recover bits of information corresponding to the plurality of symbols.

11. The optical receiver of claim 8, wherein the photonic integrator is an optical cavity resonator.

12. The optical receiver of any one of claim 1, wherein the shutter is a liquid crystal device.

13. The optical receiver of any one of claim 1, wherein the synchronizer is further configured to maintain the shutter in the closed position for the integration period of the photonic integrator and to open the shutter at the end of the integration period.

14. The optical receiver of any one of claim 1, wherein the synchronizer is configured to control the shutter between the open position and the closed position based on the integration period of the photonic integrator by controlling the shutter to be in the closed position over the integration period to thereby accumulate the optical signal energy in the photonic integrator until the photon density of the output optical signal is above the minimum threshold detection level of the photodetector.

15. An optical receiver configured to detect a low-photon-density intensity modulated optical signal, the optical receiver comprising:
  a photonic integrator configured to receive the low-photon-density intensity modulated optical signal and to produce an output optical signal, the low-photon-density intensity modulated optical signal including a plurality of symbols each symbol having a constant symbol duration and a respective intensity based on an intensity modulation scheme used to encode the low-photon-density intensity modulated optical signal, and the output optical signal including a plurality of pulses corresponding to the plurality of symbols, each pulse having an intensity proportional to the respective intensity of a corresponding symbol;
  a shutter operable between an open position and a closed position, the shutter configured to prevent the output optical signal from exiting the photonic integrator when in the closed position and to allow the output optical signal to exit the photonic integrator when in the open position;
  a synchronizer coupled to the shutter and configured to maintain the shutter in the closed position for an integration period of the photonic integrator, and to open the shutter at an end of the integration period, the integration period being based on the symbol duration; and
  a photodetector configured to detect the output optical signal when the shutter is in the open position and to emit an electrical signal corresponding to the output optical signal, the electrical signal having characteristics representative of information encoded in the low-photon-density intensity modulated optical signal via the plurality of symbols.

16. The optical receiver of claim 15, wherein at least some symbols of the plurality of symbols represent a binary 1, and wherein pulses of the output optical signal corresponding the at least some symbols representing the binary 1 have an intensity greater than a minimum threshold detection level of the photodetector.

17. The optical receiver of one of claim 15, further comprising an analog to digital converter configured to receive the electrical signal and to convert the electrical signal to a digital signal.

18. The optical receiver of claim 17, further comprising signal processing circuitry configured to receive and process the digital signal to recover the information encoded in the low-photon-density intensity modulated optical signal.

19. The optical receiver of claim 18, wherein the synchronizer is coupled to the signal processing circuitry and configured to receive timing information from the signal processing circuitry and to use the timing information to determine the end of the integration period.

20. The optical receiver of claim 15, wherein the photonic integrator is an optical cavity resonator.

21. The optical receiver of claim 15, wherein the shutter is a liquid crystal device.

* * * * *